United States Patent [19]

Suzuki et al.

[11] Patent Number: 4,661,329

[45] Date of Patent: Apr. 28, 1987

[54] CATALYST FOR OXIDIZING AN OFFENSIVELY SMELLING SUBSTANCE AND A METHOD OF REMOVING AN OFFENSIVELY SMELLING SUBSTANCE

[75] Inventors: Kenichirou Suzuki; Yoshiyasu Fujitani; Taisuke Yoshimoto; Hideaki Muraki, all of Aichi, Japan

[73] Assignee: Kabushiki Kaisha Toyota Chuo Kenkyusho, Aichi, Japan

[21] Appl. No.: 799,574

[22] Filed: Nov. 19, 1985

[30] Foreign Application Priority Data

Dec. 17, 1984 [JP] Japan ................................. 59-267115

[51] Int. Cl.$^4$ ....................... B01D 53/36; B01J 23/10; B01J 23/50; B01J 23/72
[52] U.S. Cl. ................................. 423/245; 423/213.2; 502/73; 502/244; 502/304
[58] Field of Search ................. 502/73, 244, 302, 304; 423/213.2, 245 S

[56] References Cited

U.S. PATENT DOCUMENTS 2,337,421  12/1943  Spence et al. .................. 502/302 X
3,284,370  11/1966  Clifford et al. .................... 502/304

FOREIGN PATENT DOCUMENTS 1443721  11/1968  Fed. Rep. of Germany ...... 502/244

OTHER PUBLICATIONS

Slavinskaya et al., "Liquid-Phase Catalytic Oxidation of Furan Compounds", Vses. Nauchn. Konf. Kaim., Tekhnol.
Furanovykh Soedin., 1978, pp. 101–103 [Chem. Abstracts, 180898e, vol. 92, 1980].

*Primary Examiner*—W. J. Shine
*Attorney, Agent, or Firm*—Oblon, Fisher, Spivak, McClelland & Maier

[57] ABSTRACT

A catalyst for decomposing an offensively smelling substance such as aldehydes by oxidation and a method which employs it for removing the offensively smelling substance. The catalyst comprises copper, cerium and silver supported on a porous ceramic carrier and is contacted with an offensively smelling substance to decompose it. The catalyst is particularly effective for decomposing aldehydes.

13 Claims, 2 Drawing Figures

CATALYST FOR OXIDIZING AN OFFENSIVELY SMELLING SUBSTANCE AND A METHOD OF REMOVING AN OFFENSIVELY SMELLING SUBSTANCE

BACKGROUND OF THE INVENTION

1. Field of the Invention:

This invention relates to a catalyst for oxidizing an offensively smelling substance to remove the same from exhaust gas substantially completely and a method of removing any such substance. More particularly, it relates to a catalyst and a method which are particularly effective for removing aldehydes.

2. Description of the Prior Art:

The exhaust gases from the factories and the internal combustion engines of automobiles contain contaminant, explosive, or offensively smelling substances. It is known that those substances can be removed if they are decomposed by oxidation in the presence of a catalyst.

A known catalyst for oxidizing an offensively smelling substance usually comprises a base metal, such as manganese, nickel or chromium, or a noble metal, such as platinum or palladium, or an oxide thereof supported on, for example, an alumina, silica or Kieselguhr carrier. This catalyst is, however, very unsatisfactory for decomposing aldehydes, such as formaldehyde and acetaldehyde, though it is effective for decomposing hydrocarbons, such as toluene and xylene. The exhaust gases usually contain acetaldehyde as a source of an offensive smell. It is one of the worst eight substances specified by the Japanese Law for the Prevention of an Offensive Smell. Its offensive smell is perceivable even if it may exist at a very low concentration. The results of an organoleptic test indicate that its smell does not disappear unless its concentration is reduced to less than 0.01 ppm.

The known catalyst has, however, too low a catalytic activity to oxidize aldehydes completely to remove their offensive smell, though it may be effective for reducing their concentration to some extent.

SUMMARY OF THE INVENTION

It is an object of this invention to provide a highly active oxidizing catalyst which is free from the drawbacks of the prior art as hereinabove pointed out, and which can satisfactorily decompose any offensively smelling substances, particularly aldehydes, and a method of removing any such offensively smelling substance effectively.

It is another object of this invention to provide a catalyst which can effectively remove an offensively smelling substance even at a low temperature, and a method which employs it.

The catalyst of this invention comprises 0.5 to 50% by weight of copper, 0.1 to 15% by weight of cerium and 0.1 to 20% by weight of silver supported on a porous ceramic carrier, the percentages of copper, cerium and silver being based on the weight of the carrier.

The method of this invention comprises applying copper, cerium and silver to a porous ceramic carrier to prepare a catalyst containing 0.5 to 50% by weight of copper, 0.1 to 15% by weight of cerium and 0.1 to 20% by weight of silver based on the weight of the carrier, and bringing an offensively smelling substance into contact with the catalyst in an oxidizing atmosphere to decompose the substance by oxidation.

These and other objects, features and advantages of this invention will become apparent from the following description and the accompanying drawings.

DETAILED DESCRIPTION

Figure 1:
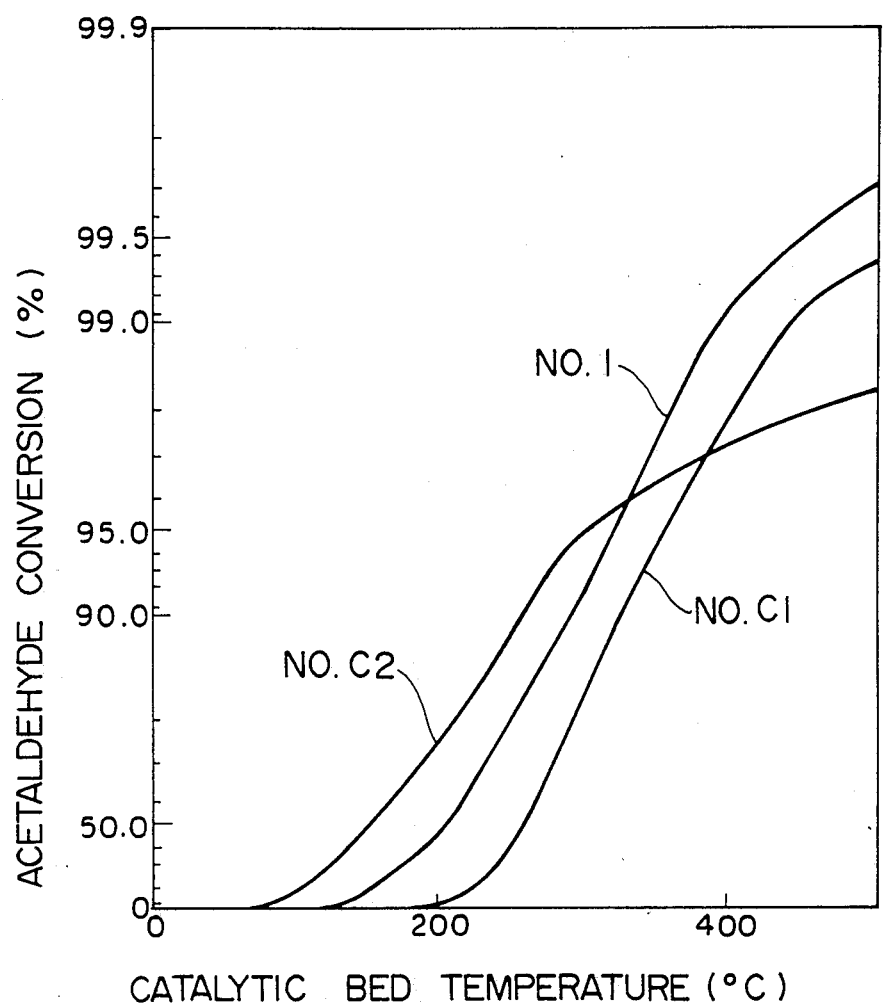
FIG. 1 is a graph showing the efficiency of acetaldehyde removal in relation to the temperature of a catalyst bed, and referring particularly to the results of EXAMPLE 1 which will hereinafter be described.

This invention is characterized by the preparation and use of a catalyst having a high oxidizing activity for removing or purifying an offensively smelling substance.

The catalyst of this invention comprises copper (Cu), cerium (Ce) and silver (Ag) supported on a porous ceramic carrier. The carrier may be of any porous ceramic material hitherto used for preparing a carrier for an oxidizing catalyst, such as alumina, silica, zirconia, magnesia, zeolite, titania, glass fiber, cordierite or Kieselguhr, or a combination or mixture thereof. It is preferably in the shape of a honeycomb, pellets or cloth. For example, it is appropriate to use a carrier formed from a nonwoven or woven cloth of glass fiber and having a surface coated with a porous ceramic material, such as alumina or silica.

The catalyst contains copper and cerium each in the form of an oxide, and either elemental silver or an oxide thereof. The catalyst contains 0.5 to 50% by weight of copper, 0.1 to 15% by weight of cerium and 0.1 to 20% by weight of silver based on the weight of the carrier. If the catalyst contains any of the metals in a quantity smaller than what is hereinabove stated, it fails to exhibit a satisfactory catalytic action. Even if it may contain any of the metals in a larger quantity, however, it is not expected to increase its catalytic activity correspondingly, but is only likely to be unduly expensive. The catalyst of this invention shows a particularly high catalytic activity if it contains 4 to 15% by weight of copper, 0.4 to 4% by weight of cerium and 0.5 to 10% by weight of silver.

The application of the metals to the carrier for preparing the catalyst of this invention may be carried out by any customary method, such as impregnation, precipitation or ion exchange. For example, the impregnation of the carrier is preferably achieved by dipping it in an aqueous solution of the nitrate, chloride, sulfate, or other salt of copper, cerium or silver, taking it out of the solution, drying it at a temperature of about 100° C. for two to 24 hours, and firing it in the air at a temperature of 400° C. to 600° C. for one to three hours. The dipping of the carrier may be carried out either separately in each of the aqueous solutions of the salts of copper, cerium and silver, or in a single solution containing a mixture of the salts of the three metals. In order to obtain a catalyst of still higher catalytic activity, however, it is preferable to dip the carrier progressively in the order of the solutions of the cerium, copper and silver salts, or first in the solution of the cerium salt and then in a solution containing a mixture of the copper and silver salts.

The copper and cerium on the carrier form oxides, while silver remains elemental or forms an oxide, too. When the carrier has been taken out of the solutions as hereinabove described, substantially the whole quantity of each metal remains in the form of its salt, and when it is fired, the salts of copper and cerium change into their respective oxides, while the salt of silver forms elemental silver or silver oxide.

According to the method of this invention, an offensively smelling substance is brought into contact with the catalyst in an oxidizing atmosphere, and thereby decomposed by oxidation. The contact between the offensively smelling substance and the catalyst can be carried out by, for example, placing the catalyst in a gas containing the substance, such as the exhaust gas of an internal combustion engine, or in the offensively smelling substance per se if it is gaseous, or passing a gas containing the offensively smelling substance through a bed of the catalyst. The oxidizing atmosphere may be composed of air or oxygen.

This invention is applicable to, for example, aldehydes, such as formaldehyde, acetaldehyde and butylaldehyde, cellosolves, such as ethyl cellosolve and butyl cellosolve, and hydrocarbons, such as toluene and xylene. It is particularly effective for decomposing aldehydes.

There is no particular limitation to the temperature at which the offensively smelling substance is brought into contact with the catalyst, or the rate at which the gas containing the offensively smelling substance is caused to flow. It is, however, preferable to employ a temperature of 300° C. to 500° C. and a space velocity of 1,000 to 150,000 $hr^{-1}$.

This invention makes it possible to decompose offensively smelling substances, particularly aldehydes, by oxidation with a high degree of efficiency. The catalyst of this invention has a high degree of low temperature activity and can, therefore, decompose an offensively smelling substance effectively even at a low temperature.

The high activity of the catalyst according to this invention is apparently due to the presence of cerium in addition to copper and silver which have a very high degree of activity. The copper and cerium on the catalyst are usually in the form of copper oxide and cerium oxide, respectively, while silver is in the form of elemental silver or silver oxide, as hereinbefore stated. The cerium oxide ($CeO_2$) is considered to have the following functions:

(a) It forms active oxygen as shown by the formula [A] and thereby imparts an oxidizing power to the catalyst:

$$2CeO_2 \rightarrow Ce_2O_3 + O \quad [A]$$

and (b) it improves the dispersion of copper and silver, thereby promoting a cycle of oxidation and reduction and providing an improved power of oxidizing an offensively smelling substance. It is apparent that both (a) and (b), or only (b) may occur when the catalyst is used for decomposing an offensively smelling substance.

The catalyst of this invention not only has a high degree of activity, but is also inexpensive, since it does not contain any noble metal that is rare and expensive.

This invention is particularly suitable for removing an offensively smelling substance from the exhaust gas of a factory or an internal combustion engine.

The invention will now be described more specifically with reference to a number of examples thereof.

EXAMPLE 1

A δ-alumina carrier in the form of pellets having a diameter of 3 mm and surface area of 50 $m^2/g$ was dipped in an aqueous solution of cerium(I) nitrate which had been prepared for enabling the carrier to support 0.8% by weight of cerium. After it had been taken out of the solution, it was dried in the air at a temperature of 120° C. for six hours and fired at a temperature of 550° C. for two hours in the presence of air. Then, the carrier was dipped in an aqueous solution of copper nitrate which had been prepared for enabling the carrier to support 8% by weight of copper. It was dried and fired as hereinabove described. The carrier was, then, dipped in an aqueous solution of silver nitrate which had been prepared for enabling the carrier to support 1% by weight of silver. It was dried in the air at a temperature of 120° C. for six hours and fired at a temperature of 450° C. for two hours in the presence of air, whereby a catalyst (Sample No. 1) embodying this invention was prepared. The precentages of cerium, copper and silver as hereinabove stated are all based on the weight of the carrier.

The catalyst was tested for the decomposition of acetaldehyde in a continuous fixed bed reactor. Air containing 100 ppm of acetaldehyde was caused to flow through the catalyst bed at a space velocity of 40,000 $hr^{-1}$ and the concentrations of acetaldehyde in the air were examined both upstream and downstream of the catalyst bed by a gas chromatograph, whereby the catalyst was evaluated for its effectiveness in acetaldehyde decomposition.

For comparison purposes, a comparative catalyst (Sample No. C1) was prepared and tested for acetaldehyde decomposition. It was prepared in the same way as Sample No. 1 and identical thereto except it did not contain any cerium. Another comparative catalyst (Sample No. C2) was also tested for acetaldehyde decomposition. It was a commercially available platinum catalyst known as Catox A-9 of Cataler Industrial Co., Ltd.

The results of the tests are shown in FIG. 1 in relation to the temperature of the catalyst bed. As is obvious from FIG. 1, Sample No. C2 (platinum) showed a slowdown in the rate of acetaldehyde decomposition in a temperature range above about 300° C., and Sample No. C1 (coppersilver) showed a low rate of acetaldehyde decomposition in a low temperature range, though it increased its effectiveness considerably with a rise in temperature. The catalyst of this invention (Sample No. 1) showed as high a rate of acetaldehyde decomposition as 99.0% at a temperature of about 400° C. and increased its effectiveness steadily in a higher temperature range. Moreover, it showed a higher degree of activity in a lower temperature range than Sample No. C1. These results confirm that this invention enables the decomposition of aldehydes by oxidation with a high degree of efficiency.

EXAMPLE 2

The catalyst of this invention (Sample No. 1 in EXAMPLE 1) and the comparative platinum catalyst (Sample No. C2) were tested for durability. Each catalyst was placed in the reactor as employed in EXAMPLE 1 and the catalyst bed was heated to a temperature of 400° C. Air containing 5 ppm of acetaldehyde, 10 ppm of formaldehyde and 1 ppm of butylaldehyde was caused to flow through the catalyst bed at a rate of 5 $m^3$ per minute and a space velocity of 50,000 hr$^{-1}$ and the concentrations of aldehydes in the air were examined both upstream and downstream of the bed in terms of the concentration of acetaldehyde, whereby each catalyst was evaluated for its effectiveness in the decomposition of the aldehydes. The results are shown in FIG. 2 in relation to time.

Figure 2:
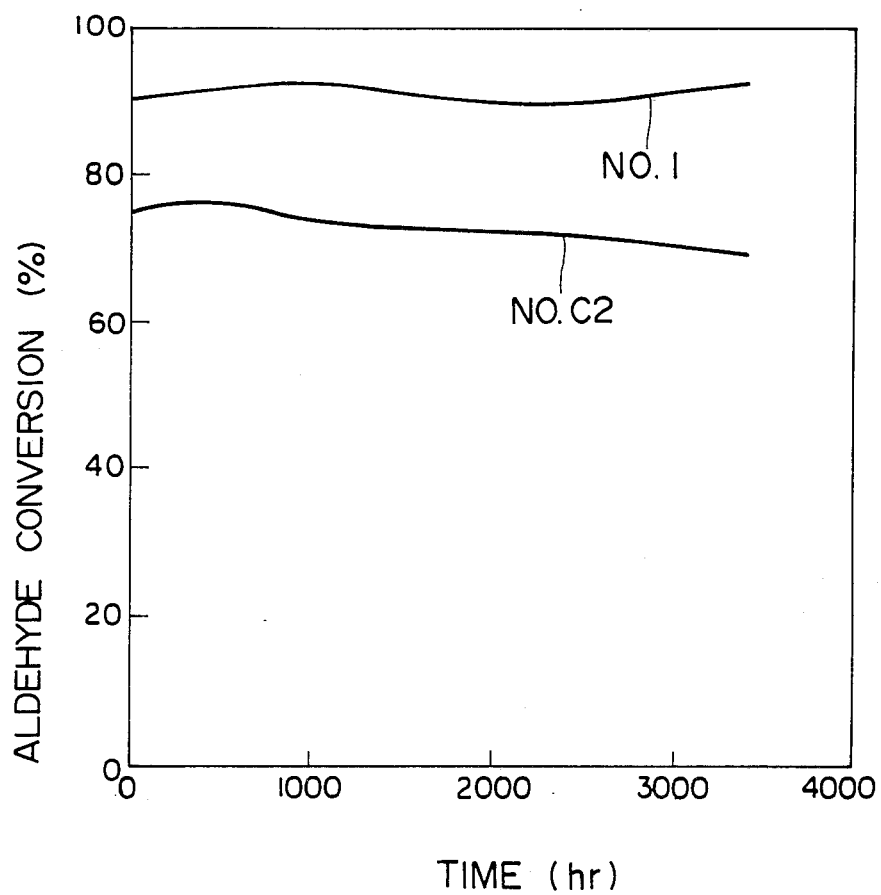
FIG. 2 is a graph showing the durability of the catalyst and referring particularly to the results of EXAMPLE 2.

As is obvious from FIG. 2, Sample No. C2 (platinum) lowered its effectiveness for aldehyde decomposition with the lapse of time, but Sample No. 1 of this invention did not show any appreciable reduction in effectiveness even after 3,000 hours of use. Moreover, the catalyst of this invention showed a considerably higher degree of effectiveness as a whole irrespective of time than the platinum catalyst. These results confirm the high durability and catalytic activity of the catalyst according to this invention.

What is claimed is:

1. A catalyst for oxidizing an offensively smelling substance, comprising 0.5 to 50% by weight of copper, 0.1 to 15% by weight of cerium and 0.1 to 20% by weight of silver supported on a porous ceramic carrier, said percentages being based on the weight of said carrier.

2. The catalyst as set forth in claim 1, wherein said carrier is formed from at least one material selected from the group consisting of alumina, silica, zirconia, magnesia, zeolite, titania, cordierite, glass fiber and Kieselguhr.

3. The catalyst as set forth in claim 1, wherein said carrier supports 4 to 15% by weight of copper, 0.4 to 4% by weight of cerium and 0.5 to 10% by weight of silver.

4. The catalyst as set forth in claim 1, wherein said offensively smelling substance contains aldehydes.

5. A method of removing an offensively smelling substance which comprises:
   (a) preparing a catalyst containing 0.5 to 50% by weight of copper, 0.1 to 15% by weight of cerium and 0.1 to 20% by weight of silver supported on a porous ceramic carrier, said percentages being based on the weight of said carrier; and
   (b) bringing said offensively smelling substance into contact with said catalyst in an oxidizing atmosphere to decompose said substance by oxidation.

6. The method as set forth in claim 5, wherein said carrier is formed from at least one material selected from the group consisting of alumina, silica, zirconia, magnesia, zeolite, titania, glass fiber, cordierite and Kieselguhr.

7. The method as set forth in claim 5, wherein said carrier supports 4 15% by weight of copper, 0.4 to 4% by weight of cerium and 0.5 to 10% by weight of silver.

8. The method as set forth in claim 5, wherein said offensively smelling substance contains aldehydes.

9. The method as set forth in claim 5, wherein said contact of said substance with said catalyst is achieved by supplying a gas containing said substance at a space velocity of 1,000 to 150,000 hr$^{-1}$ and a temperature of 300° C. to 500° C.

10. The method as set forth in claim 5, wherein said contact of said substance with said catalyst is achieved in the presence of air or oxygen.

11. The method as set forth in claim 5, wherein said offensively smelling substance contains an aldehyde selected from the group consisting of formaldehyde, acetaldehyde and butyraldehyde; a cellosolve selected from the group consisting of ethyl and butyl cellosolve; and a hydrocarbon selected from the group consisting of toluene and xylene.

12. The catalyst as set forth in claim 1, wherein said copper and said cerium are in the form of copper oxide and cerium oxide, respectively, while said silver is in the form of elemental silver or silver oxide.

13. The method as set forth in claim 5, wherein said copper and said cerium are in the form of copper oxide and cerium oxide, respectively, while said silver is in the form of elemental silver or silver oxide.

* * * * *